UNITED STATES PATENT OFFICE.

ROBERT LANCE, OF PARIS, FRANCE.

TREATMENT OF THE ORES OF CERTAIN METALS.

1,247,413.   Specification of Letters Patent.   Patented Nov. 20, 1917.

No Drawing.   Application filed June 24, 1914.   Serial No. 847,137.

*To all whom it may concern:*

Be it known that I, ROBERT LANCE, a citizen of the French Republic, and residing in Paris, France, 332 Rue Saint-Honoré, chemist, have invented certain new and useful Improvements in and Relating to the Treatment of the Ores of Certain Metals, of which the following is a complete specification.

This invention has for its object to provide an improved process for the treatment of ores of certain metals such as zinc, copper, cadmium, cobalt, nickel, etc., and more particularly pyritic, oxidized, carbonated, silicated and other ores with a view of extracting the useful elements contained therein.

The improved process consists in effecting a complete cycle, by converting the metals to be extracted into the form of chlorids, then precipitating them from the solutions while recovering or regenerating the substances which have been used for effecting the chloridization.

The first stage or stage of chloridization may take place in the cold or in heat.

In one embodiment of the invention, the metals are converted directly or indirectly into sulfates from which a solution is made by leaching. To this solution there is added a quantity of earthy alkaline chlorid sufficient to fix in the form of insoluble sulfate the sulfuric acid contained in the dissolved salts, while the metals of the latter salts remain in solution in the form of chlorids. In the second case the metals to be extracted are converted directly into the form of chlorid either by the action of gaseous hydrochloric acid at a temperature varying according as it is desired to extract certain metals by mechanical removal or by volatilizing or by leaching; or by roasting the ore with the addition of an earthy alkaline chlorid and pyrites if necessary in the presence of air and water.

The second stage after the chloridization consists in bringing the metals into solution and precipitating them in the following manner:—

The chloridized solutions obtained in one or the other case are acted upon by an earthy alkaline oxy-chlorid which precipitates the metal in the form of a hydroxid while regenerating the earthy alkaline chlorid, which is necessary either for the cold chloridization process or for the manufacture of hydrochloric acid gas or for the chloridizing roasting operation in hot chloridizing.

As an example of a cold chloridization, there will now be described the treatment of a mixed ore such as a blende, pyrites, galena having the following composition:— zinc 16.90—lead 8—copper 9.22—sulfur 19—iron 14—alumina 4—silica 29—lime 1.8—magnesia 1.20.

The operation is effected in a cast iron vessel provided with a powerful stirring apparatus and fitted with a cover having an escape pipe and a device for enabling the ore to be charged into the vessel without allowing the gases to escape therefrom. The acid liquor for one ton of ore consists of 720 kg. of sulfuric acid with 900 kg. of water. This liquor is heated to boiling point, whereupon by means of the charging device, the ore heated to 200 degrees C. is charged into the liquor. The mixture gradually thickens and at the same time the sulfur begins to be given off. A mixture of sulfurous acid, water vapor, and a small quantity of sulfur vapor escapes from the vessel.

The mixture having now acquired a pasty consistency is charged into cast iron retorts heated to about 450–500 degrees C. The sulfur distils off while the first re-action is being completed. A mixture of sulfur vapor, water vapor, sulfurous acid and sulfuric acid issues from the retort. On leaving the retort the ore in pieces is charged into a muffle furnace of the ordinary type employed for roasting blendes, and the mass is raised to a temperature of 800 degrees C.

Through a pipe or orifice there is admitted on to the lower hearth, which is the hottest, a stream of water vapor, preferably superheated steam.

This steam hydrates the sulfuric anhydrid produced by the decomposition of the sulfates and thereby facilitates its action upon the ore situated on the upper hearths of the furnace and if the acid attack has not been complete in the two preceding stages, the action of the hydrated-sulfuric anhydrid causes the acid attack to produce its maximum effect. A slight current of air mixed with the steam will convert the greater part of the iron contained in the ore into peroxid.

In cases where the ore contains but little iron, or if it is desired to effect the preoxidation in the dissolved state by ordinary methods, the acid roasting operation is stopped at 500 degrees C. after the recovery of the sulfur, so as to avoid attacking the sulfates.

The roasted ore on issuing from the furnace is washed with or without pressure by means of a solution acidified with sulfuric acid if the roasting has been effected at 800 degrees C. or by means of ordinary water if it has been stopped at 500 degrees C.

A leaching operation under air pressure with expansion several times repeated in rotary ball apparatus of the Alsing type, enables the maximum yield to be obtained.

The solid portion is separated from the liquor containing the soluble sulfates by passing said liquor through a filtering apparatus (filter press, vacuum filter, turbine).

The liquor is then treated, after neutralization if necessary, with a solution of an earthy alkaline chlorid $CaCl_2, BaCl_2$, which produces an insoluble sulfate:

$$ZnSO_4 + CaCl_2 = CaSO_4 + ZnCl_2$$

The base of the chlorid is precipitated in the form of sulfate and the metals corresponding to the sulfates remain in solution in the form of chlorids.

In the example of hot chloridization, the crushed ore is charged into a muffle furnace similar to that hereinbefore referred to and is heated to a temperature of between 700 and 900 degrees C., but instead of using water vapor and air, there is injected a stream of moist hydrochloric acid obtained by treating an earthy alkaline chlorid with sulfuric acid. In this operation it is however advisable to employ instead of the earthy alkaline chlorid an alkaline chlorid because its sulfate generally retains the same value as that of the chlorid from which it is derived:

$$3H_2SO_4 + 6NaCl = 3Na_2SO_4 + 6HCl$$
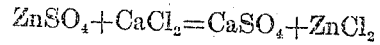
$$6HCl + 3ZnCO_3 = 3ZnCl_2 + 3H_2O + 3CO_2$$

For this method of chloridizing by means of hydrochloric acid gas there may be substituted a process of chloridizing without acid preparation. This process which is simple in its application entails a greater consumption of earthy alkaline chlorid, but it permits the use of pyrites of more or less richness instead of sulfuric acid. This process consists in adding to the mixture of ore and earthy alkaline chlorid a certain amount of iron pyrites and in treating the mass in the aforesaid furnace in the presence of air and steam.

The reaction which is then produced by the action of the heat, oxygen and steam, may be represented by the following equation in which it is assumed that a zinc carbonate ore is being treated.

$2FeS_2 + 8NaCl + 15O + 3ZnCO_3 + H_2O =$
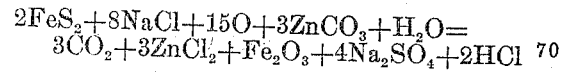
$\quad 3CO_2 + 3ZnCl_2 + Fe_2O_3 + 4Na_2SO_4 + 2HCl$ If the temperature is between 700 and 800 degrees C. the zinc chlorid will be volatilized with the hydrochloric acid and the carbonic acid.

With a zinc silicate ore the reaction is similar but more complex.

$2FeS_2 + 10NaCl + 14O + 3ZnSiO_3 + H_2O =$
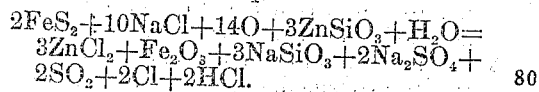
$\quad 3ZnCl_2 + Fe_2O_3 + 3NaSiO_3 + 2Na_2SO_4 +$
$\quad 2SO_2 + 2Cl + 2HCl.$ This reaction takes place only at a temperature of about 900 degrees C. and it causes the evolution of sulfurous acid and chlorin in addition to the above stated products.

The chlorids that are carried off are condensed in a scrubber of any suitable type by means of water acidified with the hydrochloric acid that escapes from the furnace, so as to convert into chlorids the oxychlorids which may have formed during the operation. The solutions are then neutralized with carbonate of lime.

In the case of oxidized, carbonated or silicated ores from lime-stone rock, the limestone is first converted by calcination into quick lime which latter is dissolved by a boiling solution of calcium chlorid or sodium chlorid, whereby the lime is converted into calcium oxy-chlorid or sodium-calcium oxy-chlorid.

When the operation is completed, the mass is passed into a filter press wherein there is obtained on the one hand a solution of calcium oxy-chlorid or sodium-calcium oxy-chlorid, and on the other hand an ore enriched or concentrated by the removal of the earthy alkaline constituents. This ore is then treated with water acidified with sulfuric acid so as to dissolve the metals which are to be extracted. Then the liquor is treated as before, after having been neutralized if necessary by means of a solution of an earthy alkaline chlorid.

In all cases, whatever may be the method of operation employed, the final product is always an aqueous solution of chlorid, namely in the particular case of the three ores above mentioned, chlorid of zinc.

The zinc is then precipitated from the solutions by adding to the latter a sufficient quantity of earthy alkaline oxy-chlorid, and in particular in the case of oxidized, carbonated or silicated ores from limestone rock, by adding the solution of calcium oxy-chlorid which has been previously produced. By this operation the zinc is precipitated in the form of hydrated oxid with a production of the earthy alkaline chlorid.

$$3ZnCl_2 + 3CaO, CaCl_2 + H_2O = 3Zn(OH)_2 + 4CaCl_2.$$

By this means the earthy alkaline chlorid has been recovered which has served for the chloridization of the sulfate liquor, for the manufacture of the hydrochloric acid gas, or for the direct treatment with pyrites as well as for the treatment of the limestone ores.

In the case of chloridization in the cold it is sufficient to concentrate the liquor to its original strength. In the other cases (chloridization in the heat) the liquor is returned to the scrubbers for dissolving fresh quantities of metallic chlorids until by the succession of the operations the liquor has become completely saturated with earthy alkaline chlorids.

The liquor is then crystallized and the chlorid crystals are used either for the manufacture of hydrochloric acid gas or for chloridizing the ore. The mother liquors are then returned to the scrubbers as before.

The whole of this process applies equally to the treatment of arsenic-sulfur ores or antimony-sulfur ores or of a mixture of both.

What I claim is:

The herein described process of extracting metals from their ores, which consists in treating the ore by a reagent to obtain a solution of a chlorid of the metal, treating the said solution with an oxy-chlorid of an alkaline earth, thereby precipitating the metal in the form of a hydroxid, and subsequently separating the metal hydroxid from the regenerated alkaline earth chlorid.

In testimony whereof I have hereunto set my hand at Paris, France, this tenth day of June, 1914.

ROBERT LANCE.

In the presence of—
  CHAS. P. PRESSLY,
  LOUIS COQUILLAT.